United States Patent
Park et al.

(10) Patent No.: US 8,477,900 B2
(45) Date of Patent: Jul. 2, 2013

(54) HOLD-DOWN SPRING UNIT FOR TOP NOZZLE OF NUCLEAR FUEL ASSEMBLY HAVING IMPROVED HOLD-DOWN PERFORMANCE AND TOP NOZZLE FOR NUCLEAR FUEL ASSEMBLY HAVING THE SAME

(75) Inventors: Joon Kyoo Park, Daejon (KR); Jin Seok Lee, Daejon (KR); Kyeong Lak Jeon, Daejon (KR); Jung Min Suh, Daejon (KR); Gi-Jun Gwon, Daejon (KR); Nam Gyu Park, Daejon (KR); Kyong Bo Eom, Daejon (KR); Jin Sun Kim, Daejon (KR); Dong Geun Ha, Daejon (KR); Kyoung Joo Kim, Daejon (KR)

(73) Assignee: Korea Nuclear Fuel Co., Ltd., Daejeon (KR)

( * ) Notice: Subject to any disclaimer, the term of this patent is extended or adjusted under 35 U.S.C. 154(b) by 612 days.

(21) Appl. No.: 12/748,369

(22) Filed: Mar. 26, 2010

(65) Prior Publication Data

US 2011/0182395 A1   Jul. 28, 2011

(30) Foreign Application Priority Data

Jan. 25, 2010 (KR) ........................ 10-2010-0006471

(51) Int. Cl.
*G21C 3/32* (2006.01)

(52) U.S. Cl.
USPC ............................. 376/364; 376/277; 376/285

(58) Field of Classification Search
USPC .................. 376/277, 285, 347, 352, 361–364
See application file for complete search history.

(56) References Cited

U.S. PATENT DOCUMENTS

| 4,645,642 | A | * | 2/1987 | Leclercq et al. | ............... 376/364 |
| 5,213,757 | A | | 5/1993 | Ohman | |
| 5,276,721 | A | * | 1/1994 | Beuerlein | ..................... 376/446 |
| 6,154,514 | A | * | 11/2000 | Murakami et al. | ............ 376/364 |
| 8,229,055 | B2 | * | 7/2012 | Park et al. | ..................... 376/364 |

* cited by examiner

*Primary Examiner* — Cassie Galt
(74) *Attorney, Agent, or Firm* — Rabin & Berdo, P.C.

(57) ABSTRACT

A hold-down spring unit for a top nozzle of a nuclear fuel assembly. The hold-down spring unit is coupled to the upper end of the top nozzle of the nuclear fuel assembly. The hold-down spring unit includes a first spring which provides a hold-down force upon the nuclear fuel assembly under start-up conditions and hot full power conditions of a nuclear reactor, and a second spring which provides an additional hold-down force upon the nuclear fuel assembly under start-up conditions of the nuclear reactor. The hold-down margin under start-up conditions and hot full power conditions is reduced, thus enhancing the mechanical and structural stability of the nuclear fuel assembly.

4 Claims, 9 Drawing Sheets

HOLD-DOWN SPRING UNIT FOR TOP NOZZLE OF NUCLEAR FUEL ASSEMBLY HAVING IMPROVED HOLD-DOWN PERFORMANCE AND TOP NOZZLE FOR NUCLEAR FUEL ASSEMBLY HAVING THE SAME

CROSS-REFERENCE TO RELATED APPLICATIONS

The present application claims priority benefits under 35 U.S.C. §119 to Korean Patent Application No. 10-2010-0006471, filed Jan. 25, 2010.

BACKGROUND OF THE INVENTION

1. Field of the Invention

The present invention relates to a hold-down spring unit for top nozzles of nuclear fuel assemblies which are used in nuclear reactors. The hold-down spring unit has an improved hold-down performance to prevent the nuclear fuel assembly from lifting up. The present invention, also, relates to a top nozzle for nuclear fuel assemblies which employ the hold-down spring unit.

2. Description of the Related Art

As is well known to those skilled in the art, a nuclear reactor is a device in which a fission chain reaction of fissionable materials is controlled for the purpose of generating heat, producing radioactive isotopes and plutonium, or forming a radiation field.

Generally, in light-water reactor nuclear power plants, enriched uranium which is increased in the ratio of uranium-235 to 2% through 5%, is used. To process enriched uranium into nuclear fuel to be used in nuclear reactors, a forming process is conducted by which uranium is formed into a cylindrical pellet having a weight of about 5 g. Several hundreds of these pellets are retained into a bundle and inserted into a zirconium tube under vacuum conditions. A spring and a helium gas are supplied into the tube and a cover is welded and sealed onto the tube, thus completing a fuel rod. A plurality of fuel rods constitutes a nuclear fuel assembly and is burned in a nuclear reactor by nuclear reaction.

FIG. 1 is a front view showing a conventional nuclear fuel assembly.

As shown in FIG. 1, the nuclear fuel assembly includes a plurality of support grids 10 through which fuel rods (not shown) are inserted, and a plurality of guide thimbles 15, which are coupled to the support grids 10. The nuclear fuel assembly further includes a top nozzle 30, which is coupled to the upper ends of the guide thimbles 15, a bottom nozzle 16, which is coupled to the lower ends of the guide thimbles 15, and the fuel rods (not shown), which are supported by springs and dimples that are formed in the support grids 10.

To assemble the nuclear fuel assembly having the above-mentioned construction, lacquer is applied to the surfaces of the fuel rods to prevent the fuel rods from being scratched and to prevent springs provided in the support grids 10 from being damaged. Thereafter, the fuel rods are inserted through the support grids 10 and then the top nozzles 30 and bottom nozzles 16 are coupled to the fuel rods, thus completing the assembly of the nuclear fuel assembly. The assembled nuclear fuel assembly is tested for distances between the fuel rods, distortion, dimensions including the length, etc. after the lacquer is removed. When the results of the test are normal, the nuclear fuel assembly is installed in a core of a nuclear reactor in which nuclear fission is produced, as disclosed in U.S. Pat. No. 5,213,757.

In the nuclear fuel assembly installed in the core, a hydraulic uplift force which is generated by the flow of coolant during the operation of the nuclear reactor is applied to the top nozzles 30 and bottom nozzles 16. Hereby, the nuclear fuel assembly is lifted up or vibrated. Furthermore, thermal expansion attributable to an increase in temperature, irradiation growth of the nuclear fuel tube as a result of neutron irradiation for a long period of time, or axial length variation caused by creep may be induced. Therefore, the top nozzle 30 is configured to ensure the mechanical and structural stability of the nuclear fuel assembly with respect to axial movement or axial length variation of the nuclear fuel assembly.

FIG. 2 is a perspective view of the top nozzle 30 according to a conventional technique.

As shown in FIG. 2, the top nozzle 30 includes a plurality of spring clamps 31 which support hold-down spring units 32. Spring insert holes 31a are formed in each spring clamp 31. The ends of the hold-down spring units 32 are inserted into corresponding spring insert holes 31a. A fastening pin hole 32a" is vertically formed through the end of each hold-down spring unit 32 which is inserted into the corresponding spring insert hole 31a. Each hold-down spring unit 32 includes a first spring 32a having a first neck part 32a', a second spring 32b and a third spring 32c which are coupled to the first neck part 32a'. The hold-down spring unit 32 is configured such that the first, second and third springs 32a, 32b and 32c are stacked on top of one another. To couple the hold-down spring unit 32 to the top nozzle 30, a spring junction end of the hold-down spring unit 32 which is opposite the first neck part 32a' is inserted into the corresponding spring insert hole 31a in the horizontal direction. Thereafter, a fastening pin 33 is inserted into the corresponding fastening pin hole 33' of the spring clamp 31 and a fastening pin hole 32a" of the hold-down spring unit 32 in the vertical direction. Thereby, the hold-down spring unit 32 is fastened to the top nozzle 30. Here, to prevent the fastening pin 33 from being removed, the fastening pin 33 is welded to an upper surface of the spring clamp 31.

As shown in FIG. 1, the top nozzle 30 having the above-mentioned construction is assembled with the elements of the nuclear fuel assembly. Subsequently, as is well known, the nuclear fuel assembly is installed in a core and disposed between an upper core plate (not shown) and a lower core plate such that the hold-down spring units 32 are supported by the lower surface of the upper core plate.

As shown in FIG. 2, the hold-down spring units 32 which are provided on the top nozzle 30 provide elastic force to the nuclear fuel assembly in response to axial movement or variation in the length of the nuclear fuel assembly so as to ensure the mechanical-structural stability of the nuclear fuel assembly. The first neck part 32a' of the first spring 32a is inserted into an insert slot 41 formed in a corresponding upper plate 40 of the top nozzle 30 in order to guide the operation of the hold-down spring unit 32 and prevent a loss of an element when the first, second or third spring 32a, 32b or 32c is damaged.

FIG. 3 is a graph showing the characteristic curve of the hold-down spring unit 32 according to the conventional technique.

As shown in FIG. 3, the hold-down spring unit 32 according to the conventional technique has the hold-down margin such that the spring force is greater than the demand hold-down force in the entire operating section and the gradient of the graph showing the spring force as a function of displacement is constant. In other words, in the hold-down spring unit 32 mounted to the top nozzle 30 according to the conventional technique, because the first, second and third springs 32a, 32b and 32c apply resistance force to the nuclear fuel assembly at the same time, the hold-down margin is provided such that the gradient of the graph showing the spring force as a function of displacement is constant. Therefore, as shown in FIG. 3, to satisfy the hold-down margin under start-up conditions, the hold-down margin under hot full power conditions becomes excessively large. As a result of the excessive hold-down margin under hot full power conditions, the hold-down spring unit 32 applies an excessive resistance force to the nuclear fuel assembly, thus deteriorating the mechanical and structural stability of the nuclear fuel assembly.

SUMMARY OF THE INVENTION

Accordingly, the present invention has been made keeping in mind the above mentioned problems occurring in the related art, and an object of the present invention is to provide a hold-down spring unit for a top nozzle of a nuclear fuel assembly which is configured such that the hold-down spring unit has the minimum hold-down margin under hot full power conditions, thus preventing the top nozzle from applying excessive resistance force to the nuclear fuel assembly, thereby enhancing the mechanical and structural stability of the nuclear fuel assembly, and a top nozzle for a nuclear fuel assembly having the hold-down spring unit.

In order to accomplish the above mentioned object, the present invention provides a hold-down spring unit coupled to an upper end of a top nozzle of a nuclear fuel assembly, including: a first spring providing a hold-down force upon the nuclear fuel assembly under start-up conditions and hot full power conditions of a nuclear reactor; and a second spring providing an additional hold-down force upon the nuclear fuel assembly only under start-up conditions of the nuclear reactor.

In order to accomplish the above mentioned object, the present invention provides a top nozzle for a nuclear fuel assembly, including: a coupling plate coupled to a guide thimble of the nuclear fuel assembly; a perimeter wall protruding upwards from a perimeter of the coupling plate, with a spring clamp provided on an upper surface of the perimeter wall; and a hold-down spring unit mounted to the upper surface of the perimeter wall. The hold-down spring unit includes: a first spring providing a hold-down force which acts upon the nuclear fuel assembly under start-up conditions and hot full power conditions of a nuclear reactor; and a second spring providing an additional hold-down force which acts upon the nuclear fuel assembly only under start-up conditions of the nuclear reactor.

The first spring can have a first ramp, and a first neck part extending downwards from an upper end of the first ramp. The second spring can have a second ramp, a neck part insert slot formed through an upper end of the second ramp so that the first neck part of the first spring is inserted through the neck part insert slot, and a second neck part extending downwards from the upper end of the second ramp, the second neck part being shorter than the first neck part of the first spring.

The hold-down spring unit can further include at least one intermediate spring provided under a lower surface of the first spring. The intermediate spring can have an intermediate ramp, and an intermediate neck part insert slot formed through an upper end of the intermediate ramp so that the first neck part of the first spring is inserted through the intermediate neck part insert slot.

The first spring, the second spring and the intermediate spring can respectively include a first support part, a second support part and an intermediate support part. The first support part, the second support part and the intermediate support part can be respectively formed by bending the lower ends of the first ramp, the second ramp and the intermediate ramp in the horizontal direction. A first pin hole, a second pin hole and an intermediate pin hole can be respectively formed through the first support part, the second support part and the intermediate support part.

The first spring, the intermediate spring and the second spring can have plate spring shapes.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, an exemplary embodiment of the present invention will be described in detail with reference to the attached drawings.

Figure 4A:
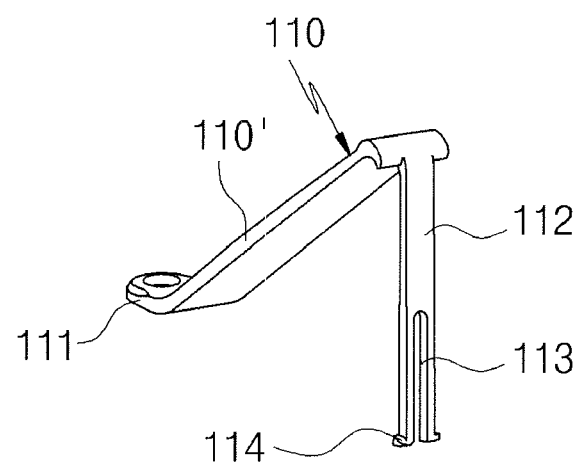
FIGS. 4A through 4C' are perspective views illustrating elements of a hold-down spring unit of a top nozzle for a nuclear fuel assembly, according to an exemplary embodiment of the present invention.
Figure 4A:
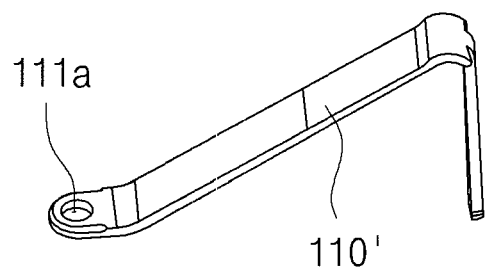
Figure 4B:
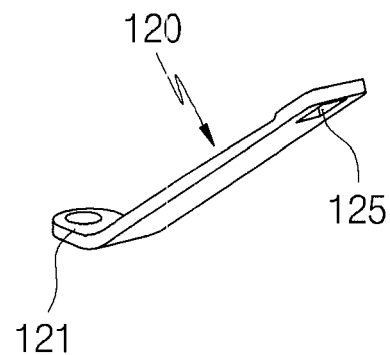
Figure 4B:
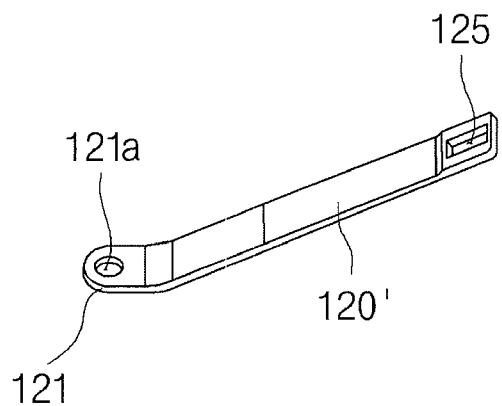
Figure 4C:
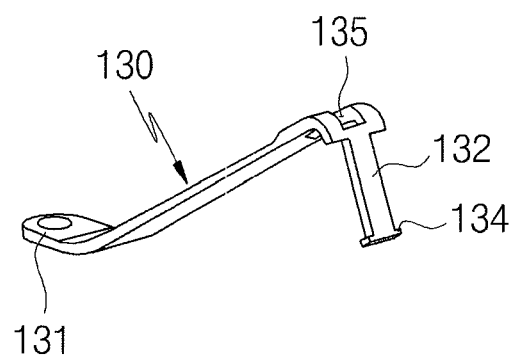
Figure 4C:
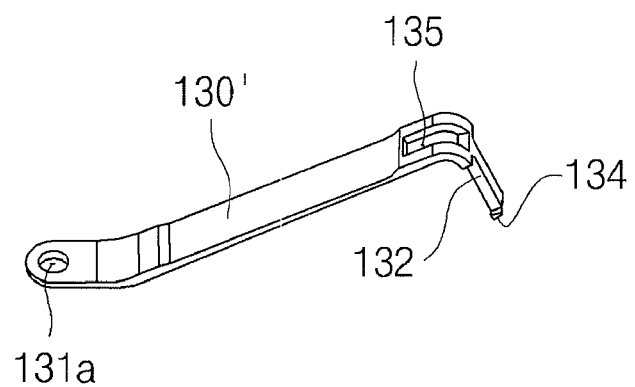
Figure 6:
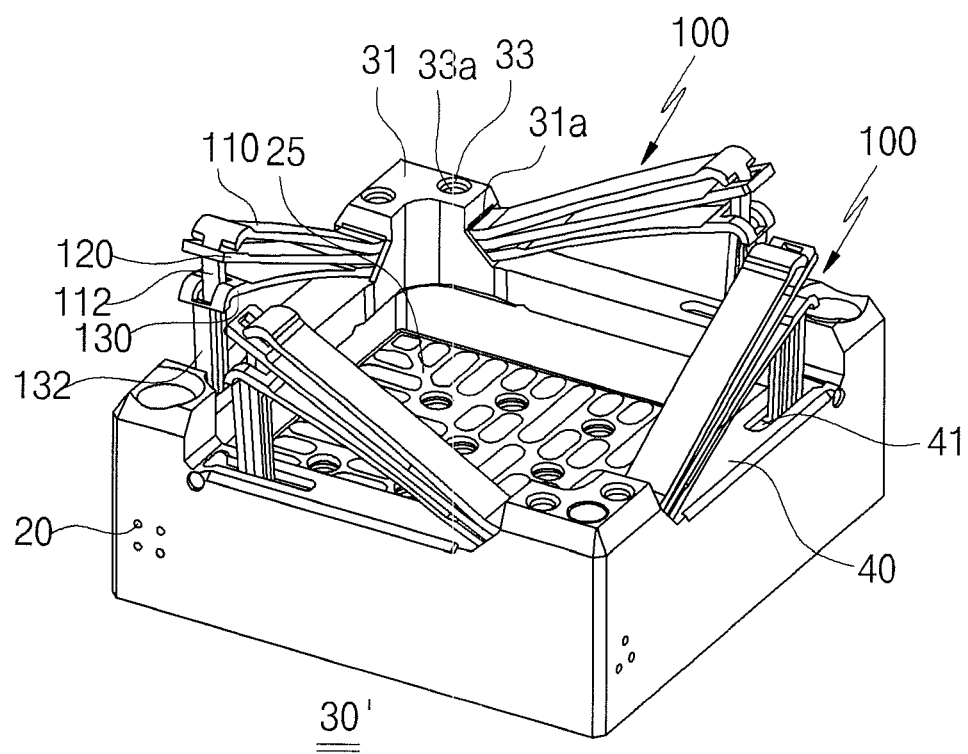
FIG. 6 is a perspective view of the top nozzle for the nuclear fuel assembly according to the exemplary embodiment of the present invention.

FIGS. 4A through 4C' are exploded perspective views illustrating a hold-down spring unit 100 used in a top nozzle 30' in FIG. 6. FIGS. 4A, 4B and 4C are bottom perspective views of a first spring 110, a second spring 130 and an intermediate spring 120; and FIGS. 4A', 4B' and 4C' are top perspective views of the first spring 110, the second spring 130 and the intermediate spring 120.

As shown in FIGS. 4A through 4C', the hold-down spring unit 100 can include the first spring 110, the second spring 130 and the intermediate spring 120.

The first spring 110 includes a first ramp 110' which is a plate spring, a first support pant 111 which is provided on a lower end of the first ramp 110', and a first neck part 112 which is bent downwards from an upper end of the first ramp 110' and extends a predetermined length. A first pin hole 111a is formed through the first support part 111, so that a fastening pin 33 is inserted through the first pin hole 111a. A first neck part slot 113 is formed in the lower end of the first neck part 112 and extends a predetermined length in the vertical direction along the central axis of the first neck part 112. First neck part hooks 114 protrude outwards from the lower end of the first neck part 112 on opposite sides of the first neck part slot 113.

The intermediate spring 120 includes an intermediate ramp 120', an intermediate support part 121 which is provided on the lower end of the intermediate ramp 120'. A neck part insert slot 125 is formed through the upper end of the intermediate ramp 120'. An intermediate pin hole 121a is formed through the intermediate support part 121 so that the fastening pin 33 is inserted through the intermediate pin hole 121a.

The second spring 130 includes a second ramp 130' which is a plate spring, a second support part 131 which is provided on the lower end of the second ramp 130', and a second neck part 132 which is bent downwards from the upper end of the second ramp 130' and extends a predetermined length. The second neck part 132 is shorter than the first neck part 112. A second pin hole 131a is formed through the second support part 131 so that the fastening pin 33 is inserted through the second pin mole 131a. A neck part insert slot 135 is formed through the upper end of the second ramp 130'. Second neck part hooks 134 protrude outwards from opposite sides of the lower end of the second neck part 132.

Figure 5:
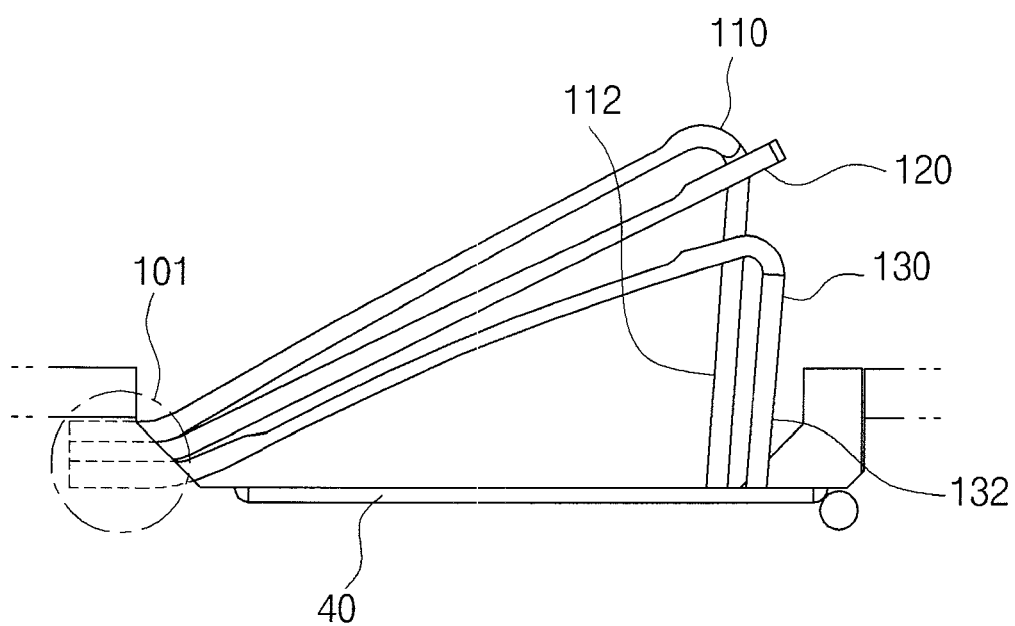
FIG. 5 is a partial side view of the top nozzle, showing the assembled state of the hold-down spring unit of FIG. 4.

FIG. 5 is a partial side view of the top nozzle 30', showing the assembled state of the hold-down spring unit 100 of FIG. 6. At the bottom of FIG. 5, the upper plate 40 is shown. At the left side of FIG. 5, the support end 101 is seen to hold together ends of the first spring 110 with its vertically oriented front neck part 112, the intermediate spring 120 and the second spring 130 with its vertically oriented second neck part 132.

FIG. 6 is a perspective view of the top nozzle 30' for the nuclear fuel assembly (hereinafter, referred to simply as 'top nozzle') according to the embodiment of the present invention.

As shown in FIG. 6, the top nozzle 30' includes a coupling plate 25, a perimeter wall 20 and a plurality of hold-down spring units 100. The coupling plate 25 is coupled to guide thimbles of the nuclear fuel assembly. The perimeter wall 20 protrudes upwards from the perimeter of the coupling plate 25. Spring clamps 31 and fastening parts (not shown) are provided on the upper surface of the perimeter wall 20. Spring insert holes 31a are formed in each spring clamp 31. The hold-down spring units 100 are provided on the upper surface of the perimeter wall 20 and the ends thereof are inserted into the corresponding spring insert holes 31a of the spring clamps 31.

As shown in FIGS. 5 and 6, each hold-down spring unit 100 is configured such that the first spring 110, the intermediate spring 120 and the second spring 130 are assembled together in layers in such a way that the first neck part 112 is inserted through the neck part insert slot 125 of the intermediate spring 120 and the neck part insert slot 135 of the second spring 130. Here, the first support part 111 of FIG. 4A, the intermediate support part 121 of FIG. 4B and the second support part 131 of FIG. 4C form a support end 101 (refer to FIG. 5) having a layered structure.

As shown in FIG. 6, to fasten the hold-down spring units 100, each of which has the layered structure attached to the top nozzle 30', the support end 101 of each hold-down spring unit 100 is horizontally inserted into the corresponding spring hole 31a of the corresponding spring clamp 31. Thereafter, the fastening pin 33 is inserted into a corresponding fastening hole 33a of the spring clamp 31, the first pin hole 111a of FIG. 4A', the intermediate pin hole 121a of FIG. 4B' and the second pin hole 131a of FIG. 4C' and fixed to the spring clamp 31 by a fixing method, such as welding, pining, nut or bolt coupling, etc., thus fastening the support end 101 (refer to FIG. 5) of the hold-down spring unit 100 to the top nozzle 30' of FIG. 6.

The lower end of the first neck part 112, which is inserted through the intermediate spring 120 and the second spring 130, is inserted and locked into an insert slot 41 of a corresponding upper plate 40 which is provided on the perimeter wall 20. The lower end of the second neck part 132 is also inserted and locked into the insert slot 41. Here, the first neck part slot 113 of FIG. 4A makes it possible to reduce the width of the lower end of the first neck part 112, thus facilitating the insertion of the first neck part 112 into the insert slot 41 of FIG. 6. The first neck part hooks 114 of FIG. 4A, which are provided on opposite sides of the first neck part 112, and the second neck part hooks 134 of FIG. 4C, which are provided on opposite sides of the second neck part 132, are inserted into the insert slot 41 of FIG. 6 and locked to the lower surface of the upper plate 40, thus preventing the first neck part 112 and the second neck part 132 from being undesirably removed from the insert slot 41. Separate locking pins may be locked to the first neck part hook 114 of FIG. 4A and the second neck part hook 134 of FIG. 4C so as more reliably to prevent the first neck part 112 of FIG. 4A and the second neck part 132 of FIG. 4C from being removed from the insert slot 41 of FIG. 6.

In the hold-down spring unit 100 having the above-mentioned construction, the second neck part 134 of FIG. 4C is locked into the insert slot 41 of FIG. 6 and thus functions to prevent a loss of an element when the first spring 110 or the second spring 130 or the intermediate spring 120 is damaged.

Furthermore, the hold-down spring unit 100 of the present invention functions to reduce hold-down margins within ranges of the positive values with respect to demand hold-down forces under hot full power conditions and start-up conditions when the nuclear reactor is operated.

Figure 7:
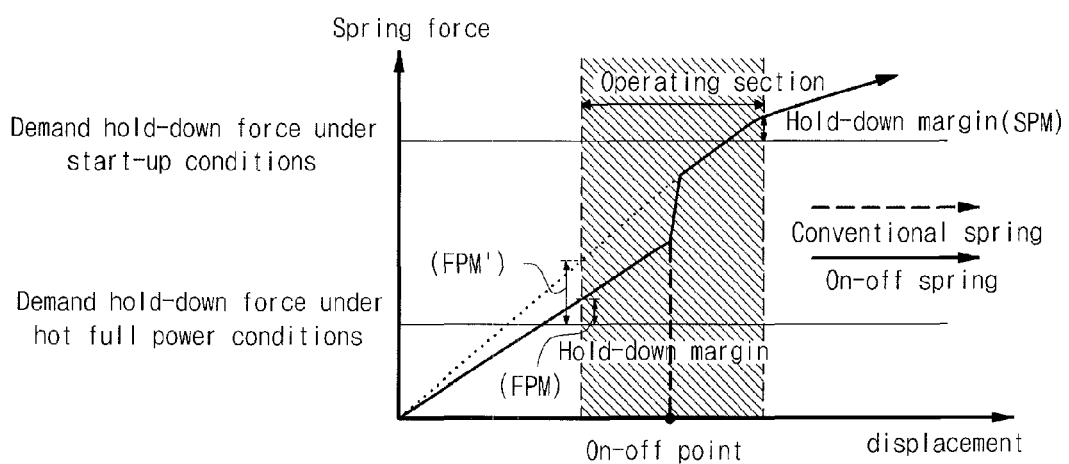
FIG. 7 is a graph showing the characteristic curve of a hold-down spring unit according to the exemplary embodiment of the present invention.

FIG. 7 is a graph showing the characteristic curve of the hold-down spring unit 100 according to the embodiment of the present invention.

Figure 1:
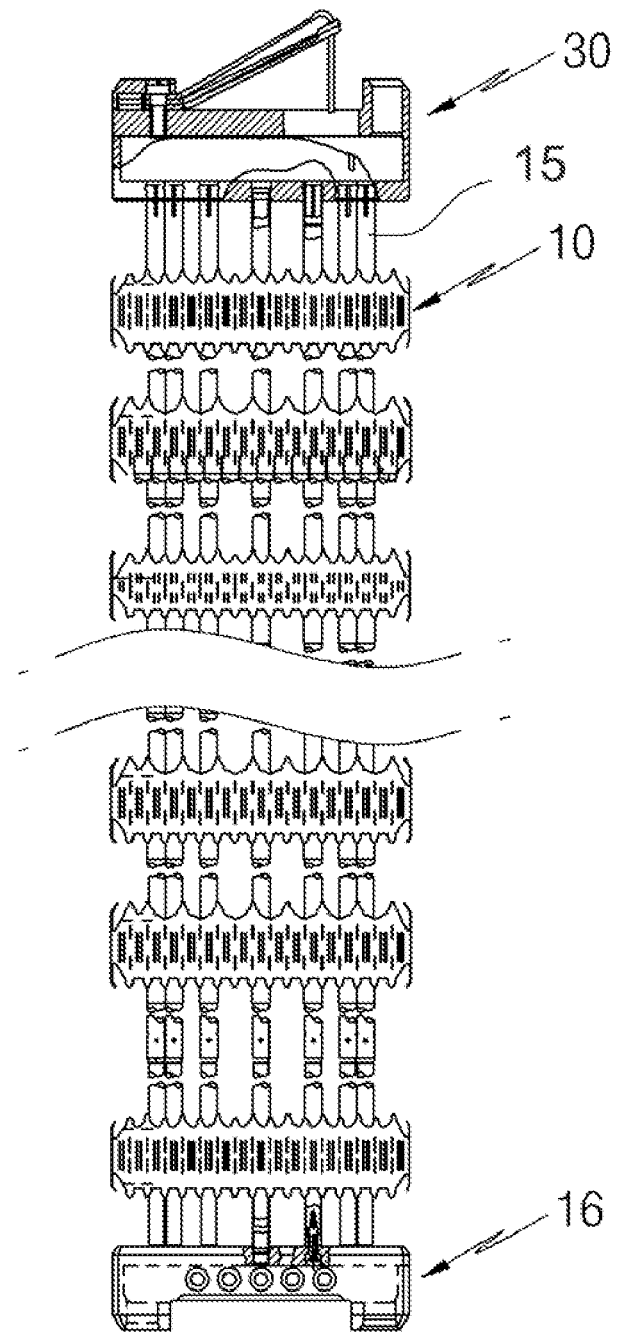
FIG. 1 is a front view showing a typical nuclear fuel assembly.
Figure 2:
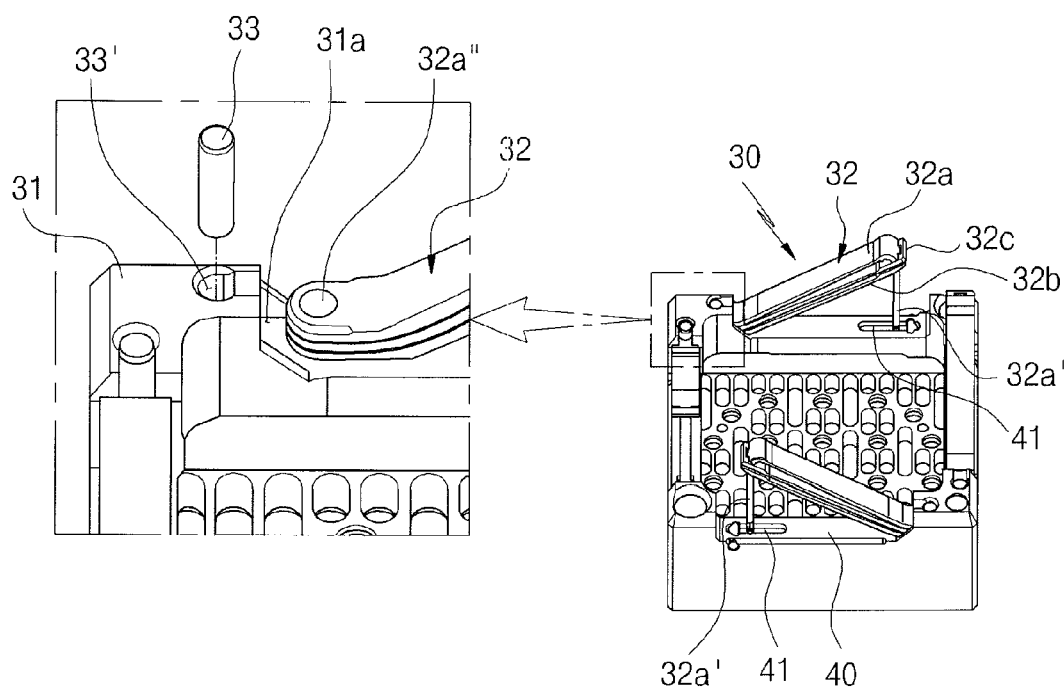
FIG. 2 is a perspective view illustrating a top nozzle of a nuclear fuel assembly, according to a conventional technique.
Figure 3:
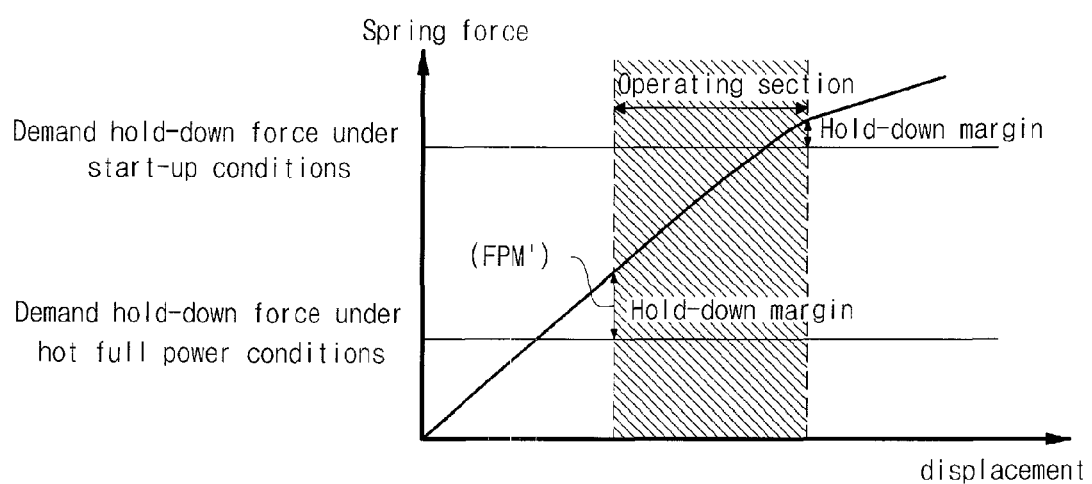
FIG. 3 is a graph showing the characteristic curve of a hold-down spring unit, according to the conventional technique.

In the graph of FIG. 7, the dotted line shows the characteristic curve of the hold-down spring unit 32 of the conventional technique of FIG. 1. The solid line shows the characteristic curve of the hold-down spring unit 100 of FIGS. 4 through 6.

As shown in FIG. 7, in the hold-down spring unit 100 according to the present invention, only the first spring 110 and the intermediate spring 120 are operated under the hot full power conditions, so that hold-down force exceeds the demand hold-down force but the hold-down margin (FPM) thereof is less than the hold-down margin (FPM') of the conventional technique.

Under the start-up conditions, after the first spring 110 and the intermediate spring 120 have entered the hold-down state, the second spring 130 also produces a hold-down force along with the first spring 110 and the intermediate spring 120. Thus, the hold-down margin is equal to or less than that of the conventional technique.

Therefore, the hold-down spring unit 100 of the present invention minimizes the hold-down margin in a section of the hot full power conditions. This margin occupies most of the entire operating section of the nuclear reactor. In addition, under the start-up conditions, the hold-down spring unit 100 acts such that hold-down force having the hold-down margin equal to or less than that of the conventional technique is generated. Thus, optimal hold-down force can be applied to the nuclear fuel assembly. Thereby, when the nuclear reactor is in operation, excessive resistance force is prevented from being applied to the nuclear fuel assembly by the hold-down spring units 100. Hence, during the operation of the nuclear reactor, the top nozzle 30' provides optimal hold-down force in response to any variation of the length of the nuclear fuel assembly, thus preventing the nuclear fuel assembly from being bent, and maintaining the position of the nuclear fuel assembly stably. As a result, the mechanical and structural stability of the nuclear fuel assembly can be enhanced.

As described above, the present invention minimizes the hold-down margin under hot full power conditions of a nuclear reactor, thus preventing resistance force from being excessively applied to a nuclear fuel assembly from a top nozzle when the nuclear reactor is in operation.

Furthermore, in the present invention, during the operation of the nuclear reactor, the top nozzle provides appropriate hold-down force in response to any variation of the length of the nuclear fuel assembly, thus maintaining the position of the nuclear fuel assembly more stably, and preventing the nuclear fuel assembly from being bent, thereby ensuring the mechanical and structural stability of the nuclear fuel assembly.

Moreover, the present invention is configured such that, under start-up conditions of the nuclear reactor, the hold-down margin is equal to or less than the desired hold-down margin to provide sufficient hold-down force, and under hot full power conditions, the hold down margin is minimized. Thereby, the present invention prevents excessive hold-down force from being applied from the top nozzle to the nuclear fuel assembly when the nuclear reactor is in operation, thus enhancing the mechanical and structural stability of the nuclear fuel assembly in the entire operating section of the nuclear reactor.

In addition, in the present invention, even if a hold-down spring unit is damaged, a loss of an element can be prevented by a neck part of a second spring.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A hold-down spring unit coupled to an upper end of a top nozzle of a nuclear fuel assembly, the hold-down spring unit comprising:
    a first spring configured to provide a hold-down force upon the nuclear fuel assembly under start-up conditions or hot full power conditions of a nuclear reactor, and including
        a first ramp having an upper end and a lower end,
        a first support part extending from the lower end of the first ramp,
        a first neck part bent downwards from the upper end of the first ramp and having a predetermined length, and
        a first neck part slot formed in a lower end of the first neck part and extending in a longitudinal direction along a central axis of the first neck part,
    a second spring configured to provide an additional hold-down force upon the nuclear fuel assembly under start-up conditions of the nuclear reactor, and including
        a second ramp having an upper end and a lower end,
        a second support part extending from the lower end of the second ramp,
        a second neck part bent downwards from the upper end of the second ramp and having a length shorter than the predetermined length of the first neck part, and
        a neck part insert slot receiving the first neck part and formed in a through-hole shape at a bent portion where an upper end of the second ramp and the second neck part are connected to each other; and
    at least one intermediate spring provided between the first spring and the second spring, each of the at least one intermediate spring, including
        an intermediate ramp having an upper end and a lower end,
        an intermediate support part extending from the lower end of the intermediate ramp, and
        an intermediate neck part insert slot receiving the first neck part and formed through the upper end portion of the intermediate ramp, and
    a support end holding the second support part, the intermediate support part and the first support part all together.

2. A top nozzle for a nuclear fuel assembly, the top nozzle comprising:
    a coupling plate coupled to a guide thimble of the nuclear fuel assembly;
    a perimeter wall protruding upwards from a perimeter of the coupling plate, with a spring clamp provided on an upper surface of the perimeter wall; and
    a hold-down spring unit mounted to the upper surface of the perimeter wall, the hold-down spring unit comprising:
        a first spring configured to provide a hold-down force upon the nuclear fuel assembly under start-up conditions or hot full power conditions of a nuclear reactor, and including
            a first ramp having an upper end and a lower end,
            a first support part extending from the lower end of the first ramp,
            a first neck part bent downwards from the upper end of the first ramp and having a predetermined length, and
            a first neck part slot formed in a lower end of the first neck part and extending in a longitudinal direction along a central axis of the first neck part,
        a second spring configured to provide an additional hold-down force upon the nuclear fuel assembly under start-up conditions of the nuclear reactor, and including
            a second ramp having an upper end and a lower end,
            a second support part extending from the lower end of the second ramp,
            a second neck part bent downwards from the upper end of the second ramp and having a length shorter than the predetermined length of the first neck part, and
            a neck part insert slot receiving the first neck part and formed in a through-hole shape at a bent portion where the upper end of the second ramp and the second neck part are connected to each other; and
        at least one intermediate spring provided between the first spring and the second spring, each of the at least one intermediate spring, including
            an intermediate ramp having an upper end and a lower end,
            an intermediate support part extending from the lower end of the intermediate ramp, and
            an intermediate neck part insert slot receiving the first neck part and formed through the upper end portion of the intermediate ramp, and
        a support end holding the second support part, the intermediate support part and the first support part all together.

3. The top nozzle as set forth in claim 1, wherein the first neck part further includes first neck part hooks protruding outwards from opposite sides of a lower end of the first neck part.

4. The top nozzle as set forth in claim 1, wherein the first neck part further includes first neck part hooks protruding outwards from opposite sides of a lower end of the first neck part.

* * * * *